C. E. SCOTT.
POTATO RECEPTACLE.
APPLICATION FILED APR. 11, 1919.
1,340,798.
Patented May 18, 1920.
4 SHEETS—SHEET 1.
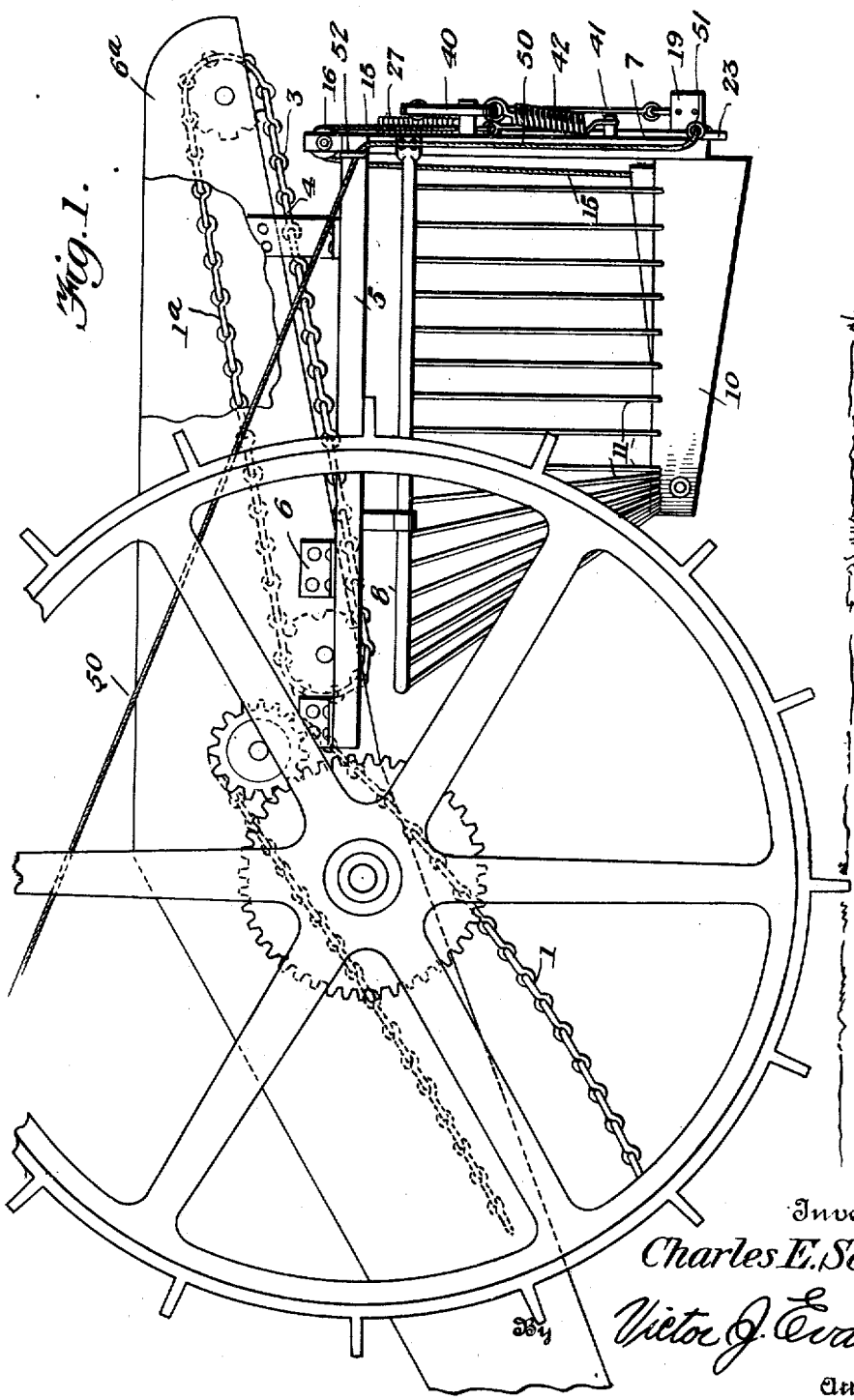
Inventor
Charles E. Scott
By Victor J. Evans
Attorney C. E. SCOTT.
POTATO RECEPTACLE.
APPLICATION FILED APR. 11, 1919.
1,340,798.
Patented May 18, 1920.
4 SHEETS—SHEET 2.
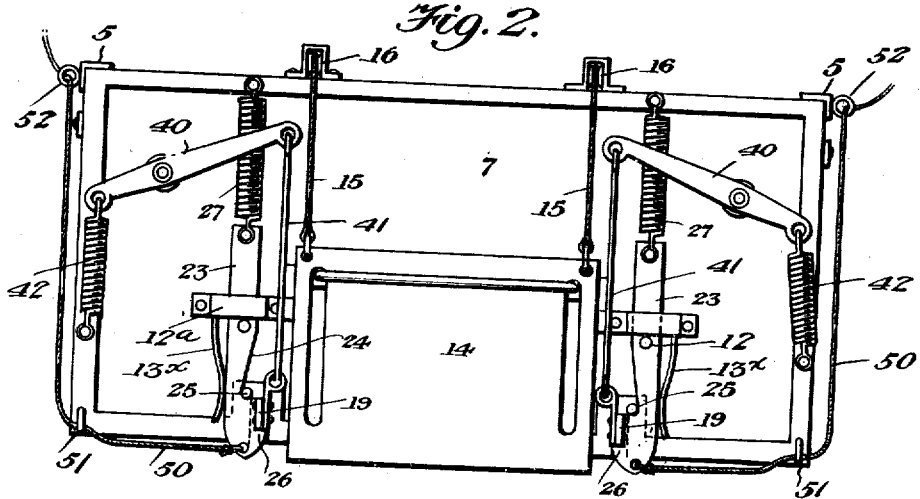
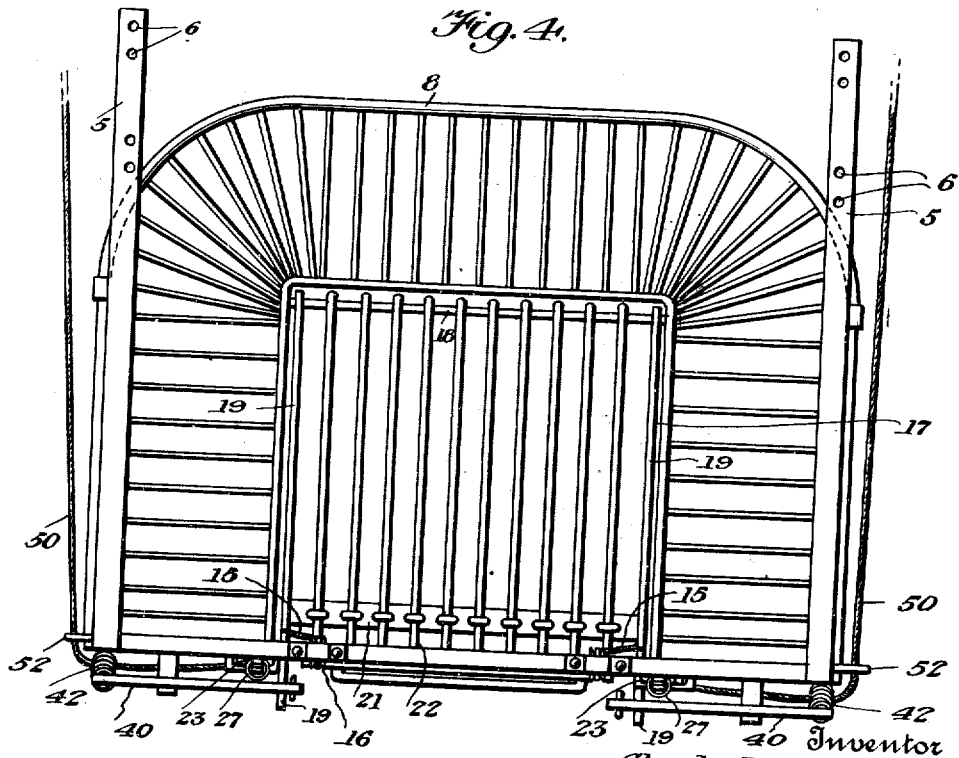
Inventor
Charles E. Scott
By Victor J. Evans
Attorney C. E. SCOTT.
POTATO RECEPTACLE.
APPLICATION FILED APR. 11, 1919.
1,340,798.
Patented May 18, 1920.
4 SHEETS—SHEET 3.
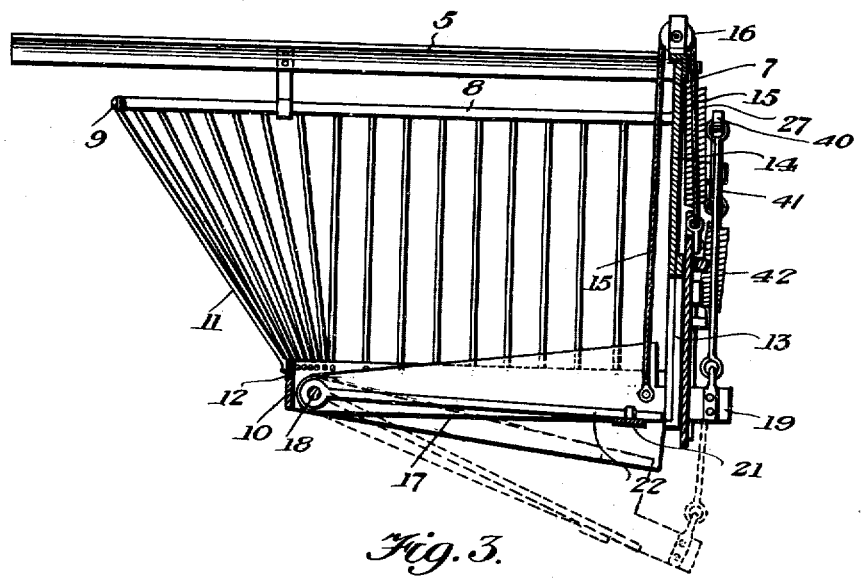
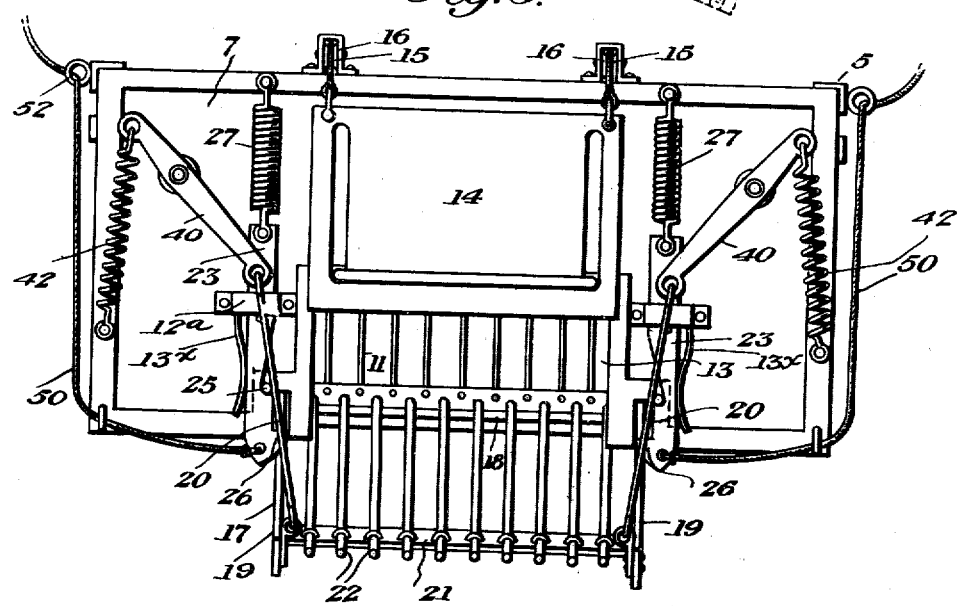
Inventor
Charles E. Scott
By Victor J. Evans
Attorney C. E. SCOTT.
POTATO RECEPTACLE.
APPLICATION FILED APR. 11, 1919.
1,340,798.
Patented May 18, 1920.
4 SHEETS—SHEET 4.
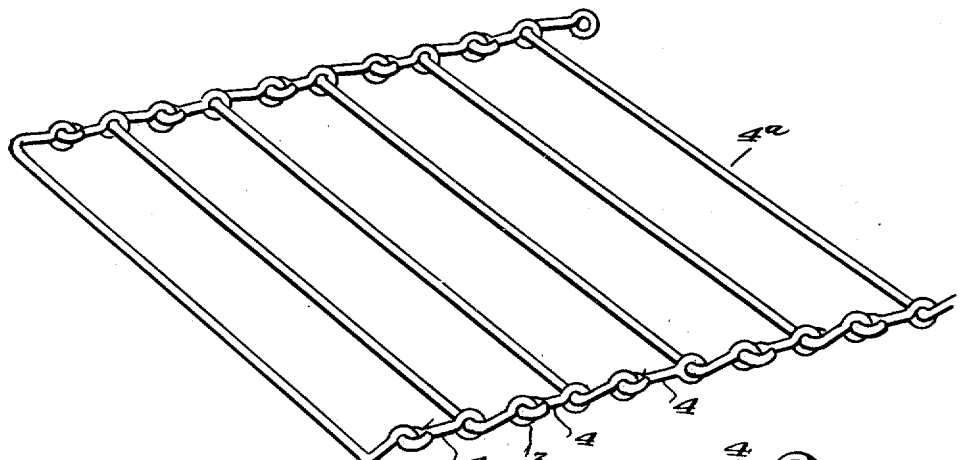
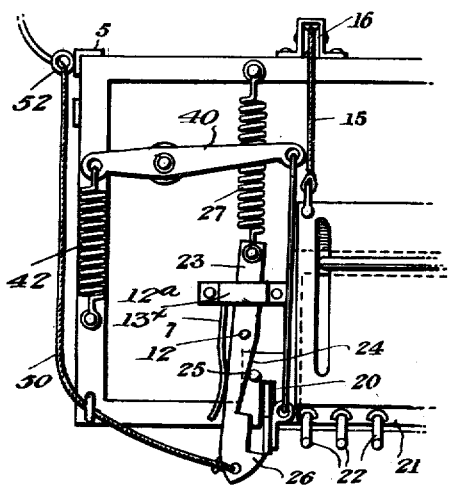
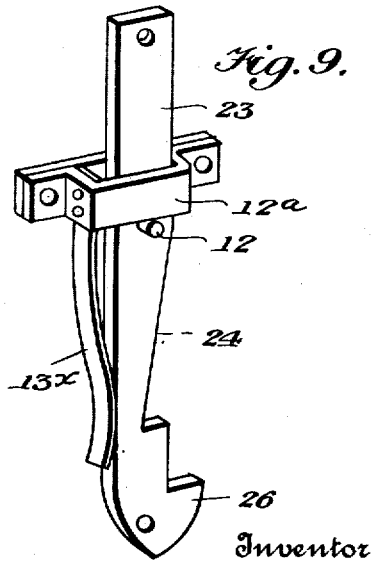
Inventor
Charles E. Scott
By Victor J. Evans
Attorney

UNITED STATES PATENT OFFICE.

CHARLES E. SCOTT, OF DEL NORTE, COLORADO.

POTATO-RECEPTACLE.

1,340,798.     Specification of Letters Patent.     Patented May 18, 1920.

Application filed April 11, 1919. Serial No. 289,188.

*To all whom it may concern:*

Be it known that I, CHARLES E. SCOTT, a citizen of the United States, residing at Del Norte, in the county of Rio Grande and State of Colorado, have invented new and useful Improvements in Potato-Receptacles, of which the following is a specification.

My present invention pertains to the harvesting of potatoes in large quantities.

The general object of my invention is the provision of a potato receptacle constructed with a view to being attached to and used in conjunction with a potato digger and having for its function to receive a volume of potatoes and to dump the potatoes automatically in piles; the size and weight of the piles being predetermined.

It also contemplates the provision of means for the manual dropping of the potatoes, this in order to avert dropping a mass of potatoes too near the end of the row where the dropped mass would be in the way of the horses as they are turned.

According to the scheme of my invention, potatoes will be deposited in piles at a suitable distance apart, and the piles will be taken up in a scoop-shaped fork, with the result that a small number of men will be enabled to economically take care of a large amount of potatoes in a short period of time.

With the foregoing in mind, the novelty, utility and practical advantages of my novel potato receptacle will be fully understood from the following description and claims when the same are read in connection with the drawings accompanying and forming part of this specification, in which:

Figure 1 is a broken side elevation showing the application of my receptacle to a potato-digging machine.

Fig. 2 is a rear elevation of the receptacle *per se* with the parts in normal positions.

Fig. 3 is a rear elevation of my novel receptacle, *per se*, with the parts in dumping position.

Fig. 4 is a plan of the receptacle.

Fig. 5 is a longitudinal vertical section of the same.

Fig. 6 is a fragmentary perspective showing a portion of the vine conveyer of the digger to which my novel receptacle is attached.

Fig. 7 is a perspective of one of the blind links comprised in the said conveyer in accordance with my invention.

Fig. 8 is a detail view illustrative of the manner in which the keeper latches 23 are automatically disengaged from the combined bottom and chute 17.

Fig. 9 is an enlarged perspective showing one of the keeper latches 23 and the parts adjacent thereto.

Similar numerals of reference designate corresponding parts in all of the views of the drawings.

As will be observed by reference to Fig. 1, my novel receptacle considered as a unit is fastened underneath and immediately in rear of the main elevator 1 and under a portion of the rear elevator or vine conveyer 3 of a potato digger, having blind links 4, best shown in Figs. 6 and 7, in order to enable the potatoes to drop between the transverse rods 4ª and through the conveyer into the receptacle, and to assure the potato vines being carried rearwardly on the conveyer and discharged to the ground in the ordinary well known manner.

Among other elements my novel receptacle comprises supporting bars 5, apertured at their forward ends and adjacent to their rear ends for attachment to hangers 6 by which they are strongly connected to the frame 6ª of the digger.

Fixed to the rear portions of the bars 5 and disposed at right angles thereto is the rear end wall 7 of the receptacle which is preferably, though not necessarily, of galvanized iron, suitably reinforced.

The basket comprised in the receptacle is made up of an upper rim 8 which is preferably of galvanized iron, is loop-shaped, and is connected at its ends to the upper portion of the rear wall 7, in combination with a lower frame 10, and spaced rods or wires 11 connected to and extending between the upper rim 8 and the frame 10. The frame 10 is of general U-shape, and is fixedly connected at the rear ends of its side bars to the rear wall 7. As clearly shown in Fig. 1, the side bars of the frame 10 are preferably increased in height rearwardly. This provision is made in order to prevent potatoes from falling off the sides of the combined bottom and chute hereinafter described, when the same begins to rise so that there is little likelihood of potatoes getting caught and preventing return of the chute to its normal position.

Manifestly the basket constructed as shown is simple and inexpensive in construction, and yet is well adapted to withstand the usage to which devices of corresponding character are ordinarily subjected.

In the central portion of the lower edge of the rear wall 7, Fig. 3, is formed a discharge opening 13. This opening 13 is controlled by a vertically slidable door 14 which is preferably held to and guided on the wall 7 and is connected to cables 15 which are carried upwardly and over sheaves 16.

Pivotally mounted in the forward portion of the basket frame 10 is a gravitating bottom and chute combined; the said element as a unit being numbered 17. The forward ends of the cables 15 are connected to the rear portion of the combined bottom and chute 17, and hence downwardly swinging movement of the element 17 will be attended by upward movement of the door 14 to permit of the free passage of potatoes through the discharge opening 13. In the preferred embodiment of my invention, the combined bottom and chute 17 is made up of a transverse shaft 18 mounted in the forward portion of the frame 10, side arms 19 connected to and extending rearwardly from the shaft 18 and through notches 20, Fig. 8, in the rear wall 7, a rear cross-bar 21 interposed between and connected to the side arms 19, and spaced rods 22 suitably connected to the shaft 18 and the cross-bar 21.

Mounted to slide vertically at the rear side of the rear wall 7 and also to move laterally in a plane parallel to said wall, are keeper latches 23. Each of these keeper latches is provided with an inclined edge 24, opposed to a stud 25 on the rear wall 7, and each is provided with a lateral inwardly directed projection 26, beveled at its lower edge and adapted to rest below and engage the rearwardly extended portions of the side arms 19, with a view to latching the combined bottom and chute 17 in its closed position. Moreover each keeper latch 23 is subject to the action of a rectractile spring 27 which is connected at its lower end to the latch and at its upper end to the upper portion of the wall 7. The springs 27 serve to return the latches 23 to and yieldingly hold the same in their normal position. When, however, the combined bottom and chute 17 is pressed downwardly by the weight of a pile of potatoes thereon, the latches 23 will be moved downwardly with the said element 17. Because of the inclined edges 24 of the keeper latches 23 engaging the studs 25, downward movement of the latches 23 will be attended by lateral outward movement thereof, with the result that the side arms 19 of the element 17 will be released from the projections 26. It will be noticed here that immediately following the release of the combined bottom and chute 17 from the latches the latches will be returned to their normal position; also, that when the combined bottom and chute 17 is raised, the side arms 19 of the element 17 will be automatically engaged and held by the latches 23.

In order to limit the upward movement of the latches 23 under the action of the springs 27, the said latches 23 are provided, by preference, with stop pins 12, designed to bring up against the guides 12ᵃ. It will also be noticed here that the guides 12ᵃ carry pendent springs 13ˣ which tend to press the latches 23 inwardly or toward each other.

Fulcrumed at intermediate points in their length on the rear wall 7 are vertically swinging levers 40 the inner arms of which are connected through pitmen 41 with the rear portions of the side arms 19 of the combined bottom and chute 17. Interposed between and connected to the outer arms of the said levers 40 and the wall 7 are retractile springs 42. These springs 42 are put under tension when the element 17 is depressed by the weight of a mass of potatoes thereon, and when the said element 17 is relieved of such weight the springs 42 will promptly return the same to its raised position. Incidental to the said upward movement of the element 17, the door 14 will gravitate to its closed position.

To provide for the manual release of the combined bottom and chute 17, I prefer to employ cables 50 that are connected to the lower ends of the latches 23 and are carried through guides 51 and 52, and from the latter guides to a point within convenient reach of the driver's seat. Manifestly by pulling upon the said cables 50 the driver is enabled to release the element 17 and bring about the discharge of the mass of gathered potatoes whenever he so desires.

In the practical use of my novel receptacle the potatoes received from the potato digger are deposited in the basket of the receptacle until a predetermined weight of potatoes is present in the basket, whereupon the power of the springs 27 will be overcome, and in consequence the rear portion of the combined bottom and chute 17 will be depressed; the door 14 will be raised, and the keeper latches 23 will be moved downwardly sufficiently far to release the side arms 19 of the element 17, whereupon the potatoes will be discharged from the combined bottom and chute 17 and through the opening 13 in the wall 7 to the ground, and this without injury to the potatoes.

Immediately subsequent to the discharge of a pile of potatoes from the combined bottom and chute 17, the working parts will be automatically returned to their normal positions by the contraction of the springs 42, and will be secured in such positions by the coöperation of the latches 23 with the rearwardly extended portions of the side arms 19 comprised in the combined bottom and chute 17.

The combined bottom and chute 17 is returned to its closed position promptly and with considerable force through the medium of the springs 42, the levers 40 and the pitmen or connecting rods 41; it being understood in this connection that when the combined bottom and chute 17 is in the receiving position, there will be but little downward pull on the connections 41. When, however, the combined bottom and chute 17 is depressed, the levers 40 will be rocked, and the springs 42 expanded, with the result that the discharge of the potatoes will be immediately followed by forcible return of the combined bottom and chute 17 to its closed position. Incidental to the said return of the combined bottom and chute 17 to the closed position, the door will gravitate to its closed position.

Having described my invention, what I claim and desire to secure by Letters-Patent, is:

1. A potato receptacle for use in conjunction with a potato digger, comprising a basket having a gravitating combined bottom and chute and also having a rear wall in which is a discharge opening, a gravitating door for closing said opening, a connection intermediate the combined bottom and chute and the gravitating door whereby when the combined bottom and chute is moved downwardly by a mass of potatoes, the door will be raised, and when said mass is discharged the door will be permitted to gravitate to closed position, and yielding means for raising the combined bottom and chute to its closed position.

2. A receptacle for use in conjunction with a potato digger, comprising a basket having a gravitating combined bottom and chute and also having a rear end wall in which is a discharge opening, a gravitating door for controlling said opening; said door being connected with the combined bottom and chute, keeper latches complementary to the combined bottom and chute, springs for raising said keeper latches, means for disengaging the keeper latches from the combined bottom and chute at the beginning of the downward movement of the combined bottom and chute, and yielding means for raising the combined bottom and chute.

3. A receptacle designed to be connected with and carried by a potato digger and embodying means including a vertically-swinging combined bottom and chute and a vertically slidable door for automatically discharging a predetermined weight of potatoes, and means for automatically restoring the discharging means to its normal position subsequently to the discharge of a mass of potatoes.

4. A receptacle designed to be connected with and carried by a potato digger and embodying means including a vertically-swinging combined bottom and chute and a vertically slidable door for automatically discharging a predetermined weight of potatoes, means for automatically restoring the discharging means to its normal position subsequently to the discharge of a mass of potatoes, and means for automatically and detachably securing the discharging means in its closed position when said means is restored to said position.

5. In a potato receptacle, the combination of a rear wall having a central opening in its lower edge, a gravitating door for controlling the opening in the rear wall, sheaves mounted on said rear wall, cables connected to the gravitating door and passed upwardly and forwardly and over the sheaves, a rim connected to and extending forwardly from the rear wall, a frame disposed below said rim and connected to and extending forwardly from the lower portion of the rear wall, inclosing means extending between and connected to said rim and frame, a gravitating combined bottom and chute pivoted at its forward portion in the forward portion of the frame and having its rear portion connected with the said cables, keeper latches movable vertically on the rear wall and having inclined edges and also having beveled portions to engage and support the rear portion of the combined bottom and chute, springs arranged to be put under tension by downward movement of said latches and to subsequently raise the latches, means whereby downward movement of the latches will be attended by lateral movement thereof to automatically disengage the latches from the combined bottom and chute, and yielding means for raising the combined bottom and chute and permitting gravitation of the door.

6. A potato receptacle for use in conjunction with a potato digger, comprising a basket having a gravitating combined bottom and chute and also having a rear wall in which is a discharge opening, a gravitating door for closing said opening, a connection between the combined bottom and chute and the gravitating door whereby when the former is moved downwardly the latter will be raised and when the former is raised the latter will be permitted to gravitate, vertically swinging levers mounted on the rear wall, retractile springs interposed between the outer arms of said levers and the wall, and connections between the inner arms of the levers and the combined bottom and chute.

7. A receptacle comprising a vertically movable combined bottom and chute, a vertically and laterally movable keeper latch complementary to the same, a spring for raising said latch, and means whereby downward movement of the latch with the combined bottom and chute will be followed by automatic disengagement of the latch from the combined bottom and chute.

8. A receptacle comprising a vertically movable combined bottom and chute, a vertically and laterally movable keeper latch complementary to the same, a spring for raising said latch, means whereby downward movement of the latch with the combined bottom and chute will be followed by automatic disengagement of the latch from the combined bottom and chute, and yielding means for pressing the latch toward the combined bottom and chute.

9. A receptacle comprising a vertically movable combined bottom and chute, a vertically and laterally movable keeper latch complementary to the same, a spring for raising said latch, means whereby downward movement of the latch with the combined bottom and chute will be followed by automatic disengagement of the latch from the combined bottom and chute, means for yieldingly holding the latches in engagement with the combined bottom and chute, and connections complementary to the latches whereby the same may be manually disengaged to release the combined bottom and chute.

In testimony whereof I affix my signature.

CHARLES E. SCOTT.